United States Patent
McDunn et al.

(10) Patent No.: US 10,072,939 B2
(45) Date of Patent: Sep. 11, 2018

(54) METHODS AND SYSTEMS FOR PROVIDING CONTEXTUAL NAVIGATION INFORMATION

(71) Applicant: Motorola Mobility LLC, Chicago, IL (US)

(72) Inventors: Kevin J McDunn, Lake in the Hills, IL (US); Eva Bills Lacivita, Grayslake, IL (US); Rakshit Khosla, Grayslake, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 15/079,506

(22) Filed: Mar. 24, 2016

(65) Prior Publication Data

US 2017/0276506 A1 Sep. 28, 2017

(51) Int. Cl.
*G01C 21/36* (2006.01)
*H04W 4/02* (2018.01)
*H04W 88/02* (2009.01)

(52) U.S. Cl.
CPC ....... *G01C 21/3608* (2013.01); *G01C 21/362* (2013.01); *H04W 4/025* (2013.01); *H04W 4/027* (2013.01); *H04W 88/02* (2013.01)

(58) Field of Classification Search
USPC ........................................................ 701/427
See application file for complete search history.

(56) References Cited

U.S. PATENT DOCUMENTS

| | | | | |
|---|---|---|---|---|
| 9,207,092 B1* | 12/2015 | Yamasaki | .......... | G01C 21/3632 |
| 2008/0077865 A1* | 3/2008 | Hiles | ...................... | G06F 3/0481 |
| | | | | 715/708 |
| 2010/0198511 A1* | 8/2010 | Hunter | ................. | G01C 21/265 |
| | | | | 701/472 |
| 2011/0178703 A1* | 7/2011 | Aben | ................. | G01C 21/3423 |
| | | | | 701/408 |
| 2012/0136573 A1* | 5/2012 | Janardhanan | ........ | G01C 21/165 |
| | | | | 701/512 |
| 2013/0103313 A1* | 4/2013 | Moore | ................... | G01C 21/20 |
| | | | | 701/533 |
| 2013/0325449 A1* | 12/2013 | Levien | ................... | G10L 15/30 |
| | | | | 704/201 |

(Continued)

OTHER PUBLICATIONS

Mark A. Rose, et al., "Systems and Methods for Managing Operating Modes of an Electronic Device", U.S. Appl. No. 14/469,800, filed Aug. 27, 2014.

(Continued)

*Primary Examiner* — Tyler D Paige
(74) *Attorney, Agent, or Firm* — Philip H. Burns, IV

(57) ABSTRACT

A method in an electronic device includes receiving, with an audio capture device such as a microphone, a request for navigational information. One or more processors of the electronic device then identify a transit mode. The one or more processors also detect, with one or more sensors, one or more contextual cues from an environment about the electronic device. The contextual cues can include a geo-location, transit mode, bearing, or other factors. The one or more processors then provide a navigation information response that is a function of the transit mode and the one or more contextual cues to a user interface of the electronic device.

20 Claims, 7 Drawing Sheets

(56) References Cited

U.S. PATENT DOCUMENTS

| | | | |
|---|---|---|---|
| 2014/0018101 A1* | 1/2014 | Namba | G06Q 10/08 455/456.2 |
| 2015/0016661 A1* | 1/2015 | Lord | H04N 21/42203 382/100 |
| 2015/0088412 A1* | 3/2015 | Foster | G01C 21/3626 701/420 |
| 2015/0088421 A1* | 3/2015 | Foster | G01C 21/3661 701/537 |
| 2015/0103018 A1* | 4/2015 | Kamin-Lyndgaard | G09G 5/006 345/173 |
| 2015/0112593 A1* | 4/2015 | Kandangath | G01C 21/3644 701/541 |
| 2015/0112919 A1* | 4/2015 | Weir | G06Q 10/08355 706/52 |
| 2015/0279354 A1* | 10/2015 | Gruenstein | G10L 15/22 704/235 |
| 2015/0345953 A1* | 12/2015 | Yato | G01C 21/165 701/469 |
| 2015/0369623 A1* | 12/2015 | Blumenberg | G01C 21/367 701/532 |
| 2016/0003637 A1* | 1/2016 | Andersen | G01C 21/3617 701/519 |
| 2016/0315928 A1* | 10/2016 | Yu | H04L 63/08 |
| 2016/0356625 A1* | 12/2016 | O'Beirne | G01C 21/3676 |
| 2017/0200249 A1* | 7/2017 | Ullrich | G06Q 50/30 |
| 2017/0276506 A1* | 9/2017 | McDunn | G01C 21/3608 |

OTHER PUBLICATIONS

Google, "Voice Search & Commands", https://support.google.com/gmm/answer/6041199?hl=en, Dec. 22, 2015, 2 pages.

"Google Now", App description; First released Jul. 9, 2012; Description available at https://en.wikipedia.org/wiki/Google_Now.

\* cited by examiner

METHODS AND SYSTEMS FOR PROVIDING CONTEXTUAL NAVIGATION INFORMATION

BACKGROUND

Technical Field

This disclosure relates generally to electronic devices, and more particularly to electronic navigation devices.

Background Art

Electronic devices, and in particular portable, wireless communication devices, are becoming increasingly technologically advanced. In response, people are becoming more dependent upon their portable electronic devices. Only a few years ago a mobile telephone was a novelty item used only for making telephone calls. By contrast, people today rely upon "smartphones" to keep up with their calendars, address books, music collections, photo albums, and so forth.

In the world of navigation, electronic navigation systems, be they vehicular, handheld, embedded in an electronic device, or other, are rapidly replacing maps and other traditional navigational tools due to their convenience of use. For example, many smartphones now include map applications that provide navigation instructions to a user so that the user can travel from an origination location to a destination location. Some electronic navigation devices include a location detection device, such as a Global Positioning System (GPS) receiver, which can determine the current location of the system using GPS satellites. Using map data located either on the device or in a remote map server, the navigation system can display a map and navigation instructions to the user.

Traditional navigation systems frequently are configured to select a route from point "A" to point "B" based solely to optimize total travel time or distance. This is often less than ideal in that it may not meet the full needs of a requestor. One problem with prior art navigation systems is that are designed upon the presumption that travel time or distance is the highest priority interest when selecting a navigation route from multiple navigation routes. However, for many people time or distance is not the foremost consideration. Other factors can be more important. There is thus a need for an improved navigation system and corresponding method for presenting navigation routes selected based upon criteria other than time or distance.

Figure 1:
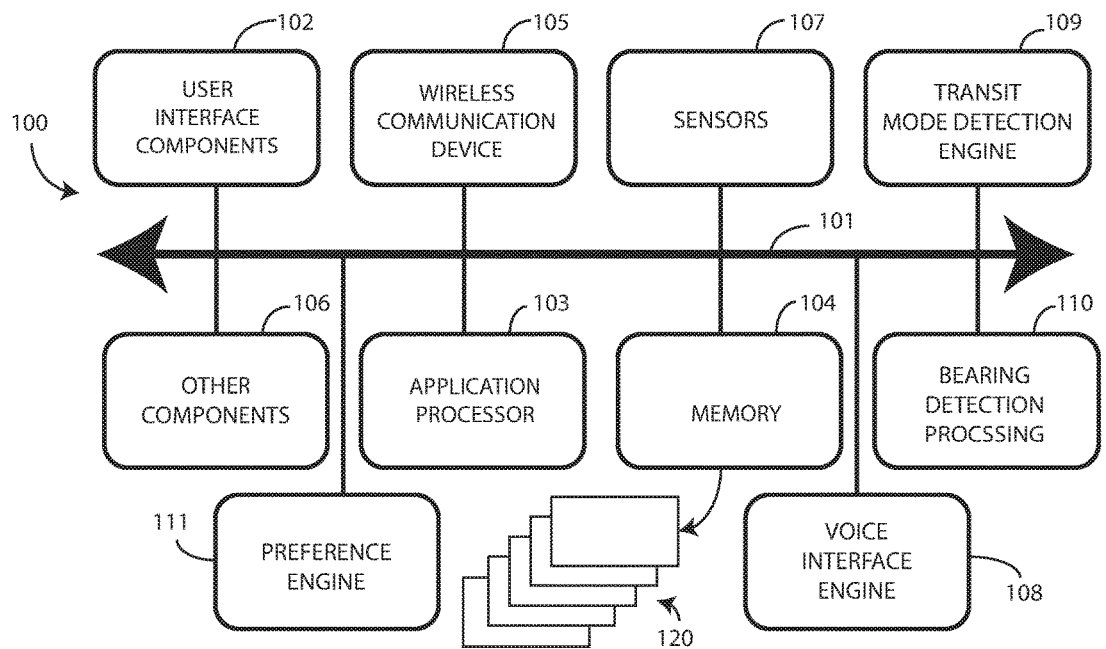
FIG. 1 illustrates one explanatory block diagram illustrating a schematic of one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to providing, with the one or more processors, a navigation information response to a request for navigational information that is a function of one or more factors such as a transit mode and one or more contextual cues. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the navigational functionality of the electronic device itself and improving the overall user experience to overcome problems specifically arising in the realm of the technology associated with providing navigational responses to requests for navigational information received in electronic devices.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of providing a navigation information response that is a function of factors such as transit mode and one or more contextual cues in an electronic device. The non-processor circuits may include, but are not limited to, a radio receiver, a radio transmitter, signal drivers, clock circuits, power source circuits, and user input devices. As such, these functions may be interpreted as steps of a method to perform device control in response to one or more multi-modal social cues. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a method and a system for providing a navigation route that is contextually preferred or optimized as a function of factors such as travel mode and bearing. Embodiments of the disclosure contemplate that providing responses to requests for navigational information in an electronic device that are solely a function of time or distance can provide a less than optimal experience for a user. Illustrating by example, when a user provides a request for navigational information comprising the command "where is the nearest gas station," prior art systems provide a list of locations based solely upon which locations are nearest the electronic device. Embodiments of the disclosure contemplate that such a response is less than optimal because the response fails to include any consideration regarding which ones are located in a bearing direction and travel mode when the electronic device is in motion.

For instance, if the electronic device is stowed in a vehicle traveling north on the Pacific Coast Highway at a rate of 55 miles per hour, it is unlikely that the user has a need for a gas station that is only 1000 yards away when those 1000 yards are to the south. To the contrary, embodiments of the disclosure contemplate that it is far more likely the user would prefer to know the location of a gas station that is farther away, perhaps a mile away, that considers a travel mode and/or bearing, i.e., one that is a mile away to the north of the user's vehicle and that is accessible from the Pacific Coast Highway at a location that is to the north of the vehicle's location when the request is made.

To resolve this and other issues, embodiments of the disclosure provide a method in an electronic device that considers factors such as travel mode and bearing when providing navigational information responses to requests for navigational information. For example, in one embodiment, an electronic device receives, with an audio capture device, a request for navigational information. Using one or more sensors and/or one or more processors, prior to providing a navigation information response, the electronic device identifies a transit mode. The electronic device then detects, with one or more sensors, one or more contextual cues from an environment about the electronic device. Once the transit mode and other contextual cues are determined, the electronic device uses this information to provide a navigation information response that is a function of the transit mode and the one or more contextual cues to a user interface of the electronic device.

Advantageously, in one or more embodiments the movement modality and direction of the electronic device can be used to filter search results before presenting the most contextually relevant results to the user. Embodiments of the disclosure thus make navigation, which can be entirely voice-controlled in one or more embodiments, dramatically more useful to a user. This is true because the user automatically receives only the most contextually relevant search results. Advantageously, embodiments of the disclosure eliminate any need for the user to physically interact with, or manipulate, a map on the display of the electronic device in an effort to manually determine which location provided in a list may happen to be both the closest and toward the direction in which they are traveling, which is a practice that can be hazardous when driving. Advantageously, in one or more embodiments navigation information responses provide only contextually relevant navigational assistance that is optimized for truly hands-free use.

Embodiments of the disclosure therefore for determining a plurality of navigation information responses, and processing each possible response to select preferred responses corresponding detected contextual information. For example, embodiments provide the application of value functions to navigation information response data corresponding to select optimized responses that are most beneficial to a user based upon one or more detected contextual cues. For example, a heuristic function can be applied as a filter. The heuristic function can be configured to consider travel mode, bearing, and other contextual cues to estimate how contextually relevant a particular navigation information response may be. From the estimate, only contextually relevant navigation information responses may be selected for provision to a user.

Turning now to FIG. 1, illustrated therein is one explanatory block diagram schematic 100 of an electronic device in accordance with one or more embodiments of the disclosure. The electronic device with which the block diagram schematic 100 can be one of various types of devices. In one embodiment, the electronic device is a portable electronic device, one example of which is a smartphone that will be used in subsequent figures for illustrative purposes. However, it should be obvious to those of ordinary skill in the art having the benefit of this disclosure that the block diagram schematic 100 could be used with other mobile communication devices having navigational capabilities as well, including vehicular navigation devices, palm-top computers, tablet computers, "smart watches," or other devices. Still other devices will be obvious to those of ordinary skill in the art having the benefit of this disclosure.

In one or more embodiments, the block diagram schematic 100 is configured as a printed circuit board assembly disposed within a device housing. Features can be incorporated into the device housing. Examples of such features include a camera, an intelligent imager, or an optional speaker port. Additionally, a user interface component such as a button or touch sensitive surface, can also be disposed along a housing member. Various components can be electrically coupled together by conductors or a bus 101 disposed along a printed circuit board.

The illustrative block diagram schematic 100 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

The illustrative block diagram schematic 100 includes a user interface 102. In one or more embodiments, the user interface 102 includes a display, which may optionally be touch-sensitive. In one embodiment, users can deliver user input to the display of such an embodiment by delivering touch input from a finger, stylus, or other objects disposed proximately with the display. In one embodiment, the display is configured as an active matrix organic light emitting diode (AMOLED) display. However, it should be noted that other types of displays, including liquid crystal displays, suitable for use with the user interface 102 would be obvious to those of ordinary skill in the art having the benefit of this disclosure.

In one embodiment, the electronic device includes one or more processors 103. In one embodiment, the one or more processors 103 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 100. Each of the application processor and the auxiliary processor(s) can be configured to process and execute executable software code to perform the various functions of the electronic device with which the block diagram schematic 100 operates. A storage device, such as memory 104, can optionally store the executable software code used by the one or more processors 103 during operation.

In this illustrative embodiment, the block diagram schematic 100 also includes a communication circuit 105 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 105 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 105 can include wireless communication circuitry, one of a receiver, a transmitter, or transceiver, and one or more antennas.

In one embodiment, the one or more processors 103 can be responsible for performing the primary functions of the electronic device with which the block diagram schematic 100 is operational. For example, in one embodiment the one or more processors 103 comprise one or more circuits operable with the user interface 102 to present presentation information to a user. The executable software code used by the one or more processors 103 can be configured as one or more modules 120 that are operable with the one or more processors 103. Such modules 120 can store instructions, control algorithms, and so forth.

Other components 106 operable with the one or more processors 103 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

Various sensors 107 can be operable with the one or more processors 103. As will be shown in more detail below with reference to FIGS. 2 and 3, these sensors 107 can include both physical sensors (FIG. 2) and virtual sensors (FIG. 3). Generally speaking, physical sensors include sensors configured to sense or determine physical parameters indicative of conditions in an environment about an electronic device. Illustrating by example, the physical sensors can include devices for determining information such as motion, bearing, location, travel mode, acceleration, orientation, proximity to people, places, and other objects, lighting, capturing images, and so forth. The physical sensors can include various combinations of microphones, location detectors, motion sensors, physical parameter sensors, temperature sensors, barometers, proximity sensor components, proximity detector components, wellness sensors, touch sensors, cameras, audio capture devices, and so forth. Many examples of physical sensors are described below with reference to FIG. 2. Others will be obvious to those of ordinary skill in the art having the benefit of this disclosure.

By contrast, the virtual sensors do not measure physical conditions or parameters. Instead, they infer context from data of the electronic device. Illustrating by example, while a physical sensor might include a camera or intelligent imager to capture a picture, virtual sensors may use data from the captured picture, or from applications operating in the electronic device to infer or detect one or more contextual cues. For instance, if an intelligent imager captures a photograph of a subway train, a virtual sensor may extrapolate from that photograph and from location data from a GPS system that the user is about to board a train.

Similarly, a virtual sensor may consult a calendaring application, a contact list application, or other application operating within the electronic device to determine contextual cues. If, for example, a user's schedule shows a lunch meeting at Chez Henry, and Chez Henry is fifteen miles to the north of the user's home, the virtual sensors may determine that it is highly probable that the user will be traveling north prior to the lunch meeting. From information such as this, the virtual sensors can assist in determining factors such as travel mode, bearing, and other contextual cues.

Other virtual sensors may analyze other data to infer context, including user profiles, user purchasing history, device operating states, energy storage within a battery, application data, data from third parties such as web services and social media servers, alarms, time of day, behaviors a user repeats, and other factors. Many examples of the virtual sensors are described below with reference to FIG. 3. Others will be obvious to those of ordinary skill in the art having the benefit of this disclosure. The virtual sensors can be configured as either hardware components, or alternatively as combinations of hardware components and software components. The virtual sensors can collect and analyze non-physical parametric data in addition to physical data.

The one or more processors 103 can be configured to apply heuristic filters to data received from the various sensors 107. Illustrating by example, the one or more processors 103 can use statistical data, factors, filters, and functions that indicate or otherwise correspond to one or more contextual cues detected or determined by the various sensors 107 to select navigation information responses that are most contextually relevant to a user. In one embodiment, the contextual cues can be combined or applied in conjunction with transportation information such as transportation mode and/or bearing to calculate a contextually relevant factor or value that corresponds to a particular user's transportation mode, transportation speed, transportation bearing, and so forth.

In one or more embodiments, a voice interface engine 108 is included. The voice interface engine 108 can include hardware, executable code, and speech monitor executable code in one embodiment. The voice interface engine 108 can include, stored in memory 218, basic speech models, trained speech models, or other modules that are used by the voice interface engine 108 to receive and identify voice commands that are received with audio input captured by an audio capture device. In one embodiment, the voice interface engine 108 can include a voice recognition engine. Regardless of the specific implementation utilized in the various embodiments, the voice interface engine 108 can access various speech models to identify speech commands.

In one embodiment, the voice interface engine 108 is configured to implement a voice control feature that allows a user to speak a specific device command to cause the one or more processors 103 to execute a control operation. In one or more embodiments, a user can employ the voice interface engine 108 to deliver, and receive, audible commands and responses. For example, the user may say, "Where is the nearest gas station?" This question comprises a request for navigational information requesting the one or more processors 103 to retrieve, in conjunction with the one or more sensors 107 and/or the communication circuit 105, information regarding nearby gas stations to provide a navigation information response to the request. Consequently, this request for navigation information can cause the one or more processors 103 to access a navigation server, across a network, to search for suitable navigation information responses. In one or more embodiments, the one or more processors can then deliver at least one navigation information response as audible output via an audio output of the other components 106. In short, in one embodiment the voice interface engine 108 listens for voice commands in the form of requests for navigational information, processes the commands and, in conjunction with the one or more processors 103, returns an output in the form of a navigation information response that is contextually relevant to a user.

A transit mode detection engine 109 is operable to determine a mode of transit for the electronic device. Examples of modes of transit include whether a user is walking with an electronic device, riding a bicycle with an electronic device, traveling in a car with an electronic device, riding a bus with an electronic device, riding a train with an electronic device, and so forth. Other transit examples will be obvious to those of ordinary skill in the art having the benefit of this disclosure.

The transit mode detection engine 109 can be operable with the various sensors 107, such as a camera or intelligent imager, a magnetic field detection device, a wireless communication detection device, or other sensors, to infer data and process information to detect a mode of transit. For example, if the electronic device is being transported on a train with many passengers, where some or all of the passengers also have wireless communication devices, the transit mode detection engine 109 can detect electronic signals of these other devices. As the electronic device moves, the number of these surrounding signals will stay relatively constant due to the fact that the passengers are unable to leave the train between stops. By contrast, if the electronic device were being transported in a car, surrounding wireless communication signals would continually pass by the electronic device. Accordingly, in one embodiment the transit mode detection engine 109 can be operable with various sensors 107 to process electronic signals from these sensors to infer a mode of transit.

In another example, the transit mode detection engine 109 may be operable with acoustic sensors to sample acoustic sounds from an environment about the electronic device. Working in conjunction with, for example, the voice interface engine 108, the transit mode detection engine 109 may detect numerous voices about the electronic device that are not those of the device's owner. This data would suggest that the user is on a form of public transit, rather than, for example, being in a private vehicle. Other examples of inputs from which the transit mode detection engine 109 may determine a transit mode are described below with reference to FIG. 5. Still others will be obvious to those of ordinary skill in the art having the benefit of this disclosure.

A bearing detection processing engine 110, operating in conjunction with the various sensors 107, is then operable to determine a bearing of travel for the electronic device. The bearing includes, in one embodiment, a direction of travel. The bearing can also include a speed of travel as well. Illustrating by example, in one embodiment the bearing detection processing engine 110 can be operable with location detectors of the various sensors 107 to receive location information for the electronic device from either terrestrial or satellite GPS services. By calculating differences between updates of the location information, the bearing detection processing engine 110 can determine both a direction of travel and optionally a rate of travel.

In one or more embodiments, when the voice interface engine 108 receives a request for navigational information, the one or more processors 103 are operable with the transit mode detection engine 109 to determine a transit mode for the electronic device. The one or more processors 103 can also be operable with the bearing detection processing engine 110 to determine a bearing for the electronic device. In one embodiment, the bearing comprises a direction of transit for the electronic device. In another embodiment, the bearing comprises a speed of transit of the electronic device. Of course, combinations of direction of transit and speed of transit can be used as well.

Working with one or more remote servers, the one or more processors 103 can retrieve potential navigation response information that is responsive to the request for navigational information. For example, if the request is "where is the nearest gas station," the potential navigation response information may include a list of gas stations within a predefined radius of the electronic device.

Once the potential navigation response information is retrieved, the one or more processors 103 can filter the potential navigation response information as a function of the transit mode and transit direction and/or speed of transit to provide only contextually relevant selections from the potential navigation response information as a navigation response. If, for example, the one or more processors 103 determine that an electronic device is traveling northeast on Interstate 85, rather than providing a list of fifty gas stations within a ten mile radius in response to the request "where is the nearest gas station," the one or more processors 103 will instead filter the fifty gas stations as a function of the transit mode and bearing to provide a subset of gas stations that are located at upcoming exists along Interstate 85. Advantageously, this provides a user with a selection of only approaching gas stations rather than those they have already passed.

A preference engine 111 can provide more granularity in filtering the potential navigation response information to obtain an even more contextually relevant navigation information response. In one or more embodiments, the preference engine 111 considers additional data, including prior user behavior, user preferences, itinerary information, and other information to further filter the potential response information. Continuing the example from above, embodiments of the disclosure contemplate that a user may have preferences in a particular brand of gasoline. Alternatively, the user may routinely frequent a specific gas station because they have particularly delicious coffee. Accordingly, the one or more processors 103 may be operable with the preference engine 111 to provide a navigation information response that includes the specific gas station (provided it meets the transit mode and bearing criteria) or only gas stations offering the particular brand of gasoline. Examples of inputs from which the transit mode detection engine 109 may determine a transit mode are described below with reference to FIG. 5. Still others will be obvious to those of ordinary skill in the art having the benefit of this disclosure.

In one embodiment, the preference engine 111 is operable to apply heuristic filters or other algorithms to data from the various sensors 107 to determine navigation information responses that can be prioritized based upon how contextually relevant they are to a user. For instance, price requirements, brand requirements, previous purchase history or patronage history, calendar and itinerary information, and so forth, may be combined with transit mode and bearing information into a heuristic filter to determine a resulting contextually relevant impact value that is used to select navigation information responses from potential navigation response information. Heuristic functions can be configured, for example, to estimate which gas station is both upcoming and provides the highest probability that the user can stay on schedule for the day.

In one or more embodiments, the preference engine 111 includes a heuristic sensor processor that is operable with the various sensors 107 to detect, infer, capture, and otherwise determine contextual cues occurring in an environment about an electronic device to select navigation information responses from potential navigation response information. For example, in one embodiment, the heuristic sensor processor of the preference engine 111 determines, from the various sensors 107, assessed contexts and frameworks using adjustable algorithms of context assessment employing information, data, and events. These assessments may be learned through repetitive data analysis. Alternatively, a user may employ the user interface 102 to enter various parameters, constructs, rules, and/or paradigms that instruct or otherwise guide the heuristic sensor processor of the preference engine 111 in filtering the potential navigation response information to obtain an even more contextually relevant navigation information response as a function of transit mode, bearing, contextual cues, and other contextual information. The heuristic sensor processor of the preference engine 111 can comprise an artificial neural network or other similar technology in one or more embodiments.

In one or more embodiments, the one or more processors 103 can control the heuristic sensor processor of the preference engine 111. In other embodiments, the heuristic sensor processor of the preference engine 111 can operate independently, delivering information gleaned from detecting contextual cues and other contextual information to the one or more processors 103. The heuristic sensor processor of the preference engine 111 can receive data from the various sensors 107. In one or more embodiments, the one or more processors 103 are configured to perform the operations of the heuristic sensor processor of the preference engine 111.

Figure 2:
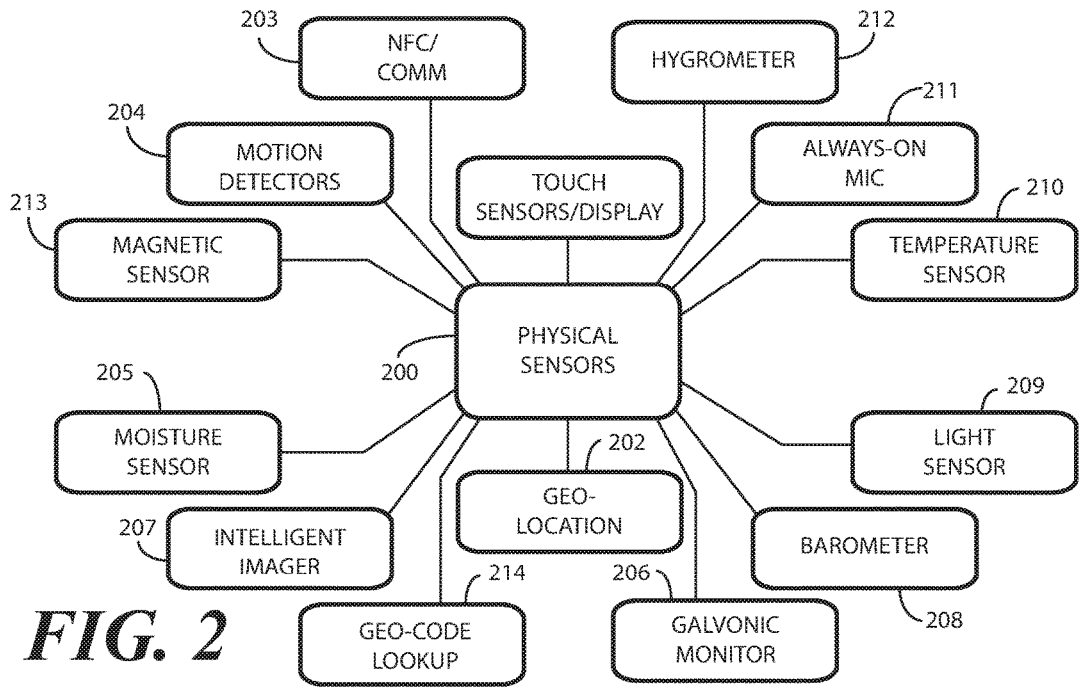
FIG. 2 illustrates one or more physical sensors suitable for use, alone or in combination, in an electronic device in accordance with one or more embodiments of the disclosure.
Figure 3:
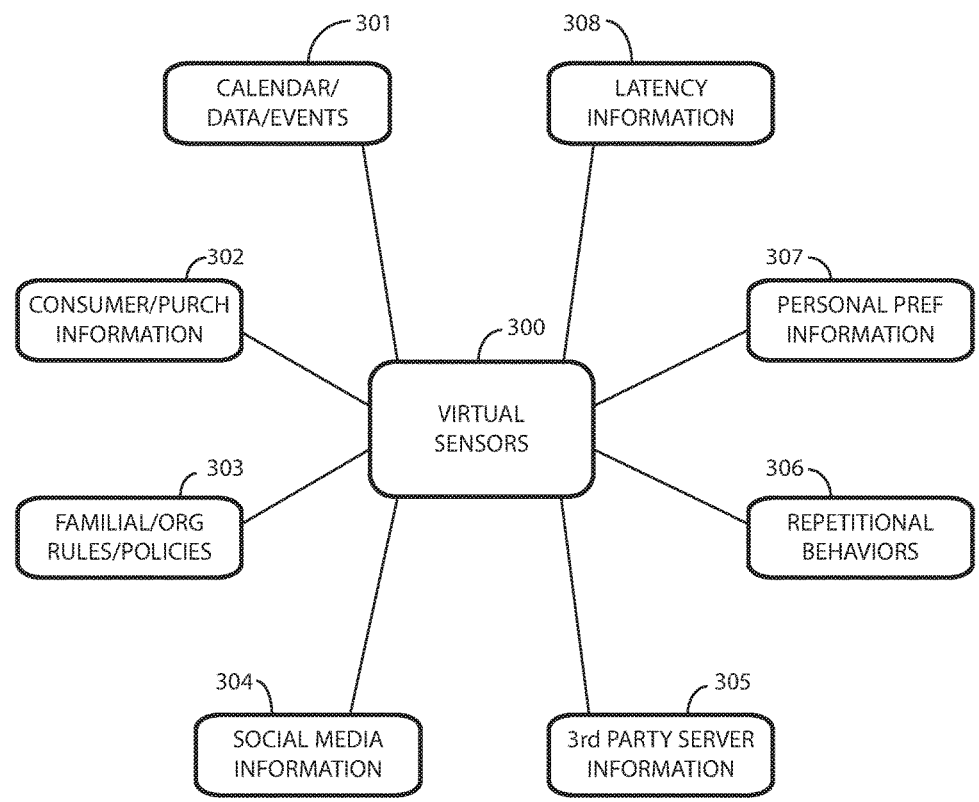
FIG. 3 illustrates one explanatory method suitable for use in an electronic device in accordance with one or more embodiments of the disclosure.

Turning now to FIG. 2, illustrated therein are various examples of the physical sensors 200 that can be included, in various combinations, with the sensors (107) described above with reference to FIG. 1. As noted above, physical sensors 200 are to sense or determine physical parameters indicative of conditions in an environment about an electronic device. FIG. 2 illustrates several examples physical sensors 200. It should be noted that those shown in FIG. 2 are not comprehensive, as others will be obvious to those of ordinary skill in the art having the benefit of this disclosure. Additionally, it should be noted that the various physical sensors 200 shown in FIG. 2 could be used alone or in combination. Accordingly, many electronic devices will employ only subsets of the physical sensors 200 shown in FIG. 2, with the particular subset defined by device application.

A first example of a physical sensor is a touch sensor 201. The touch sensor 201 can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors (103), to detect an object in close proximity with—or touching—the surface of the display or the housing of an electronic device by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Touch sensors 201 can be used, for example, to detect transit mode. If a user is interacting with a touch sensor for instance, it is unlikely that the user is riding a bicycle or driving a car. It is far more likely that the user is walking or riding in a car or riding public transit. Accordingly, touch sensors 201 can be sued to determine contextual cues that allow filtering of potential navigation response information to obtain a contextually relevant navigation information response in one or more embodiments.

Another example of a physical sensor 200 is a geo-locator that serves as a location detector 202. In one embodiment, location detector 202 is able to determine location data when an image is captured from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) GPS in the United States of America, the Global Orbiting Navigation System (GLONASS) in Russia, and other similar satellite positioning systems. The satellite positioning systems based location fixes of the location detector 202 autonomously or with assistance from terrestrial base stations, for example those associated with a cellular communication network or other ground based network, or as part of a Differential Global Positioning System (DGPS), as is well known by those having ordinary skill in the art. The location detector 202 may also be able to determine location by locating or triangulating terrestrial base stations of a traditional cellular network, such as a CDMA network or GSM network, or from other local area networks, such as Wi-Fi networks.

In one or more embodiments, the location detector 202 receives location information corresponding to the electronic device from one or more terrestrial networks or GPS satellites. The process can repeat, with the location detector 202 receiving updated location information as the electronic device moves. Upon receiving information corresponding to movement of the electronic device, the one or more processors (103) can determine bearing. Additionally, other information such as navigation route can be inferred as well.

In one or more embodiments, the location detector 202 can be operable to access map information as well. The map information can be stored locally within a memory (104). Alternatively, the location detector 202 may access map information from a remote server across a network using the communication circuit (105). The map information can include, but is not limited to, digital road map data, route alternatives, route guidance, route algorithms, route storing algorithms, map databases having distributed map database and traffic databases, and the like.

Where retrieved from a remote server, the map information may further include traffic servers that contain traffic information. The traffic information can include, but is not limited to, traffic reports, traffic conditions, speed data, and the like. The remote server can employ traffic databases containing traffic information, such as traffic conditions, road closures, construction, and the like. The remote server can include point of information databases as well, which provide information for points of interests such as gasoline stations, restaurants, motels, and movie theatres. In one embodiment the remote server communicates with the location detector 202 by sending and receiving content data such as local traffic reports and information from news agencies.

Another possible physical sensor 200 is a near field communication circuit 203. The near field communication circuit 203 can be included for communication with other electronic devices, local area networks, and so forth to receive information relating to transit mode, bearing, or other contextual cues. Illustrating by example, the near field communication circuit 203 may poll other electronic devices to determine how many electronic devices are within a predefined radius and whether and/or how frequently that number is changing. As noted above, when many devices surround an electronic device, this can be indicative of the electronic device moving on public transit. Accordingly, transit mode information can be received from the near field communication circuit 203.

Additionally, the near field communication circuit 203 can identify known devices to determine transit mode. If, for example, a user is traveling in their car, the near field communication circuit 203 can identify the vehicular audio system, for example, via near field communication. This identification can indicate that the electronic device is within the car. Optionally, this communication can retrieve speed and or compass information from the vehicle as well to determine bearing. Alternatively, when the near field communication circuit 203 identifies a kiosk or other device, this may indicate that a user is carrying the electronic device through a mall or airport. The near field communication circuit 203 can also be used to obtain image or other data from social media networks. Examples of suitable near field communication circuits include Bluetooth communication circuits, IEEE 801.11 communication circuits, infrared communication circuits, magnetic field modulation circuits, and Wi-Fi circuits.

Another example of a physical sensor 200 is a motion detector 204. Illustrating by example, an accelerometer, gyroscopes, or other device can be used as a motion detector 204 in an electronic device. Using an accelerometer as an example, an accelerometer can be included to detect motion of the electronic device. This contextual motion information can be used to determine bearing. Additionally, the accelerometer can be used to sense some of the gestures of the user, such as running or walking to determine transit mode.

The motion detector 204 can also be used to determine the spatial orientation of an electronic device as well in three-dimensional space by detecting a gravitational direction. This can determine, for example, if a user is holding the electronic device while riding in an elevator. In addition to, or instead of, an accelerometer, an electronic compass can be included to detect the spatial orientation of the electronic device relative to the earth's magnetic field. Similarly, one or more gyroscopes can be included to detect rotational motion of the electronic device.

Another example of a physical sensor is a moisture detector 205. A moisture detector 205 can be configured to detect the amount of moisture on or about the display or the housing of the electronic device. This can indicate various forms of context. Sometimes, it can indicate rain or drizzle in the environment about the electronic device. This can indicate a transit mode. For example, if rain or drizzle is on the housing, it can be inferred that the device is likely not within a car, bus or train. It is more likely that the user is walking, bicycling, riding a skateboard, or engaging in another form of outdoor transit.

The moisture detector 205 can be realized in the form of an impedance sensor that measures impedance between electrodes. As moisture can be due to external conditions, e.g., rain, or user conditions, perspiration, the moisture detector 205 can function in tandem with ISFETS configured to measure pH or amounts of NaOH in the moisture or a galvanic sensor 206 to determine not only the amount of moisture, but whether the moisture is due to external factors, perspiration, or combinations thereof.

An intelligent imager 207 can be configured to capture an image of environments about an electronic device and determine whether the object matches predetermined criteria. For example, the intelligent imager 207 operate as an identification module configured with optical recognition such as include image recognition, character recognition, visual recognition, facial recognition, color recognition, shape recognition and the like. Advantageously, the intelligent imager 207 can be used to recognize various transit modes, including cars, bicycles, trains, busses, and so forth. Additionally, the intelligent imager 207 can be used to determine a number of persons detected about an electronic device, which can be indicative of transit mode as well. If fifty people are detected about a moving electronic device, it is more likely that the device is on some form of public transit that, for example, in a car.

In addition to capturing photographs, the intelligent imager 207 can function in other ways as well. For example, in some embodiments the intelligent imager 207 can capture multiple successive pictures to capture more information that can be used to determine bearing and/or location. By referencing video or successive photographs with reference data to determine landmarks, road signs, and the like, bearing information, including transit direction and speed of transit information can be obtained. Alternatively, the intelligent imager 207 can capture or video frames, with accompanying metadata such as motion vectors. This additional information captured by the intelligent imager 207 can be used to detect bearing and/or location.

A barometer 208 can sense changes in air pressure due to environmental and/or weather changes. This information can be used to determine bearing. If, for example, a person is traveling with an electronic device from a low elevation, such as the coast, to a higher elevation, such as continental mountains, changes in elevation and weather can be used to determine bearing.

In one embodiment, the barometer 208 includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

A light sensor 209 can detect changes in optical intensity, color, light, or shadow in the environment of an electronic device. This can be used to make inferences about both transit mode and bearing. For example, if the light sensor 209 detects low-light conditions in the middle of the day when the location detector 202 indicates that the electronic device is moving, this can be due to the fact that the user is traveling in a subway car through a tunnel. An infrared sensor can be used in conjunction with, or in place of, the light sensor 209. The infrared sensor can be configured to detect thermal emissions from an environment about an electronic device, such as when sunlight is incident upon the electronic device. Where, for example, the infrared sensor detects cool air blowing on the electronic device on a warm day, this can indicate that the electronic device is traveling in a car with an air conditioner blowing on it. Similarly, a temperature sensor 210 can be configured to monitor temperature about an electronic device.

The physical sensors 200 can also include an audio capture device 211. In one embodiment, the audio capture device 211 includes one or more microphones to receive acoustic input. While the one or more microphones can be used to sense voice input, voice commands, and other audio input, in some embodiments they can be used as environmental sensors to sense environmental sounds such as rain, wind, and so forth. Each of these inputs can be used to determine both transit mode and bearing.

In one or more embodiments, the one or more processors (103) may use information from the audio capture device 211 to analyze acoustic signals to determine transit mode. The "clack-clack-clack" of a train sounds very different from the "vrrrrmmmmmmm" of an automobile. Accordingly, transit mode information can be gleaned from the audio capture device 211.

In one embodiment, the one or more microphones include a single microphone. However, in other embodiments, the one or more microphones can include two or more microphones. Where multiple microphones are included, they can be used for selective beam steering to, for instance, determine from which direction a sound emanated. Illustrating by example, a first microphone can be located on a first side of the electronic device for receiving audio input from a first direction, while a second microphone can be placed on a second side of the electronic device for receiving audio input from a second direction. The one or more processors (103) can then select between the first microphone and the second microphone to beam steer audio reception toward the user. Alternatively, the one or more processors (103) can process and combine the signals from two or more microphones to perform beam steering.

In one embodiment, the audio capture device 211 comprises an "always ON" audio capture device. As such, the audio capture device 211 is able to capture audio input at any time that an electronic device is operational. As noted above, in one or more embodiments, the one or more processors, which can include a digital signal processor, can identify whether one or more people are about the electronic device. This can be indicative of whether the person is on public transportation or is traveling in a private vehicle.

One further example of the physical sensors 200 is a hygrometer 212. The hygrometer 212 can be used to detect humidity, which can indicate that a user is outdoors or is perspiring. This can indicate transportation through manual means, such as on a bicycle or skateboard. By contrast, a dry environment can indicate a different transit mode, such as being within an air-conditioned car.

A magnetic interference sensor 213 can detect magnetic interference from external sources. If, for example, the electronic device is being transported on a subway where cars are powered by electric engines, the magnetic interference sensor 213 can detect this to infer transit mode.

A geocode lookup engine 214 can reference various third party servers to obtain known route information. The geocode lookup engine 214 can then plot, using information from the motion detectors 204, updated user location information to determine whether the electronic device is traveling, for example, along a road, a subway line, a public bus route, and so forth. Additionally, the geocode lookup engine 214 can determine whether the bearing changes. If, for example, the electronic device is stopping at known stop signs along a road, the geocode lookup engine 214 can determine this by comparing the motion information with the third party route information.

Embodiments of the disclosure can make various determinations of transit mode and/or bearing using the physical sensors 200. Illustrating by example, using the near field communication circuit 203 and/or communication circuit (105), an electronic device may be able to accurately determine whether it is being transported by private vehicle or via public transportation by analyzing signal data corresponding to signals that originate from nearby devices or components. In some cases, the signal data may include wireless personal area network signals and/or wireless local area network signals that are broadcast by nearby electronic devices. In other cases, the signal data may identify a nearby wireless access point for a local area network or the like. Generally, the greater number of nearby electronic devices that are detected, the greater the chance that the electronic device is being transported via public transportation. Further, an access point that is detected both before and after a threshold period of time is an indication that the electronic device is being transported via public transportation. Moreover, the electronic device may be on public transportation if the same nearby electronic devices are detected in multiple instances in time. Other examples of using the physical sensors 200 to determine transit mode and/or bearing will be obvious to those of ordinary skill in the art having the benefit of this disclosure.

It should be noted that the illustrative physical sensors 200 of FIG. 2 are not comprehensive. Numerous others could be added. For example, a wind-speed monitor could be included to detect wind. Accordingly, the physical sensors 200 of FIG. 2 are illustrative only, as numerous others will be obvious to those of ordinary skill in the art having the benefit of this disclosure.

Turning to FIG. 3, illustrated therein are various examples of virtual sensors 300. As with FIG. 2, the examples shown in FIG. 3 do not constitute a comprehensive list. Numerous other virtual sensors 300 will be obvious to those of ordinary skill in the art having the benefit of this disclosure.

Calendar information, itinerary information, and locally stored events 301 can be used as context cues to filter potential navigation response information to provide only contextually relevant selections from the potential navigation response information as a navigation response. If, for example, a calendar event indicates that a meeting is occurring soon at a different location, this can be used to filter available gas stations to only those gas stations on navigation routes between the origination location and the location of the meeting. Embodiments of the disclosure accordingly can be operable to filter potential navigation response information to provide the most relevant selections in an effort to keep the user on schedule with their day's calendar or itinerary.

Consumer purchase information 302 can certainly be a contextual cue that is useful in filtering potential navigation response information to provide only contextually relevant as a navigation response. If, for example, a person historically only buys Phil's Brand gasoline, this information can be used to filter available gas stations to only those gas stations offering Phil's Brand gasoline that are upcoming in accordance with the transit mode and bearing factors.

Organizations can have formal rules and policies 303, such as from which vendors' goods can be purchased. Illustrating by example, a company may limit the gasoline its employees can purchase while traveling to a particular brand. Similarly, a company may limit restaurants or hotels to a select group. Accordingly, this information can be used to filter available gas stations, restaurants, or hotels to only those meeting company requirements, and that are upcoming in accordance with the transit mode and bearing factors.

Social media 304 in formation can indicate social cues. For example, if a user posts on social media "I love Phil's Brand gasoline. It stopped all my pings and knocks. I tried Bob's Brand gasoline, but my car didn't run well," this information can be used to filter available gas stations to include those gas stations offering Phil's Brand gasoline and exclude those selling Bob's Brand gasoline. This is in addition to selecting those offering Phil's Brand gasolines that are upcoming along a determined or estimated travel route in accordance with the transit mode and bearing factors.

Such information can be inferred from retrieving information from a social media server. Real time searches, which may be a keyword search, image search, or other search, of social media services can find images, posts, and comments relating to a location obtained from a request for navigational information. Images posted on a social media service server that were taken at the same location may also reveal contextual cues. Alternatively, commentary regarding a location, such as that in the example given above, can imply contextual cues. Information from third party servers 305 can be used in this manner as well.

Another example of the virtual sensors 300 is repetitive behavior information 306. If, for example, a person always stops at a coffee shop between 8:00 and 8:15 AM on their way to work, the request "find me a coffee shop" may result in a filtering operation selecting only available coffee shops along a determined or estimated travel route in accordance with the transit mode and bearing factors having the same brand as the coffee stop frequented by the user.

An additional example of the virtual sensors is personal preference information 307. This can include price requirement information, frequent patronage information, and so forth. In some embodiments, the personal preference information 307 is obtained from requests for navigational information. For example, a user may say, "Find me a hamburger restaurant with hamburgers under two dollars." The "under two dollars" constitutes personal preference information 307 in the form of price requirement information. Other types of personal preference information 307 will be obvious to those of ordinary skill in the art having the benefit of this disclosure.

Yet another example of virtual sensors 300 is a latency sensor 308. Embodiments of the disclosure contemplate that when considering transit mode and bearing, there will be some navigation information responses that will be along the user's upcoming path, but that will be so close that it may not be convenient, practical, or intelligent for the user to attempt to navigate to them. Illustrating by example, a user may be traveling in a left lane when one destination suitable for inclusion in a navigation information response is located at an exit a few hundred feet away. It may not be practical for the user to expect to merge across traffic to reach the exit. Accordingly, when using the latency sensor 308, possible destinations suitable for inclusion with a navigation information response can be filtered as a function of a minimum latency that makes any suggested destination convenient, practical, or intelligent for the user to attempt to reach.

As with FIG. 2 above, the virtual sensors 300 of FIG. 3 do not constitute a comprehensive list. Virtual sensors 300 can be any type of device that infers context from data of the electronic device. The virtual sensors 300 can be configured as either hardware components, or alternatively as combinations of hardware components and software components. The virtual sensors 300 can sensors can analyze information to assist filtering potential navigation information options to a contextually relevant navigation information response, thereby further informing inferences about the user's intent and what navigation information responses are appropriate given a determined composite social context.

The virtual sensors 300 can be configured to collect and analyze non-physical parametric data. While some are shown in FIG. 3, numerous others could be added. Accordingly, the virtual sensors 300 of FIG. 3 are illustrative only, as numerous others will be obvious to those of ordinary skill in the art having the benefit of this disclosure. It should be noted that one or both of the physical sensors (200) or the virtual sensors 300, when used in combination, can be cascaded in a predefined order to detect a plurality of contextual cues to provide contextually relevant navigation information responses.

Figure 4:
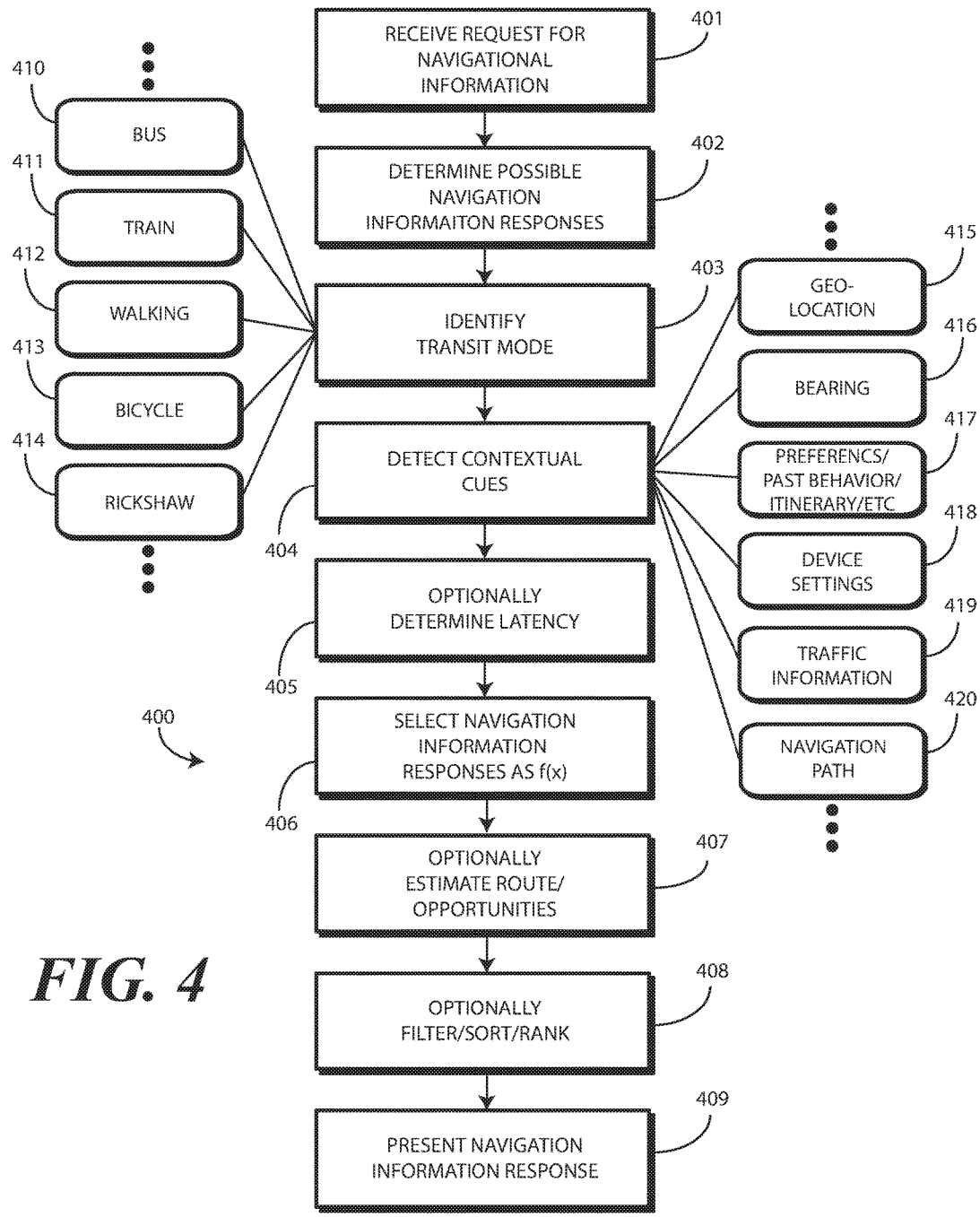
FIG. 4 illustrates explanatory input factors for use with one or more methods in accordance with one or more embodiments of the disclosure.

Turning now to FIG. 4, illustrated therein is one explanatory method 400 for operating an electronic device in accordance with one or more embodiments of the disclosure.

Beginning at step 401, the method 400 receives, with an audio capture device such as the one or more microphones, a request for navigational information. Examples of requests for navigational information include "where is the nearest gas station," "find me an upcoming Buster's Coffee shop," "where can I get a veggie burger," and so forth. Other examples of requests for navigational information will be obvious to those of ordinary skill in the art having the benefit of this disclosure.

In one or more embodiments, the request for navigational information received at step 401 comprises a destination name where a plurality of destinations each has the destination name. Illustrating by example, if Buster's Coffee shop is a chain, there may be tens or hundreds or thousands of Buster's Coffee shops.

At step 402, the method 400 includes determining possible navigation responses. As noted above, this can include referencing point of information databases with the location detector (202), referencing third party servers with a geocode lookup engine 214, retrieving information from third party servers 305 with virtual sensors 300, and other techniques discussed above.

At step 403, the method 400 identifies a transit mode as previously described. Examples of transit modes include busses 410, trains 411, walking 412, bicycling 413, rickshaw 414 and other modes of transit. Still other transit modes will be obvious to those of ordinary skill in the art having the benefit of this disclosure.

At step 404, the method 400 detects one or more contextual cues. Examples of contextual cues include location 415, which may be a changing location, bearing 416, which can include direction of transit and/or speed of transit, user preferences, past behaviors, calendar information, and itinerary information 417, user device settings and manually entered preferences 418, and traffic information. The user preferences, past behaviors, calendar information, and itinerary information 417 can be locally stored within a memory (104) of an electronic device. The contextual cues can include traffic information 419 such that the destinations in the navigation information response will be easier to access due to lighter traffic than are other possible destinations. The contextual cues can also include an estimated navigation route 420 of the electronic device so as to keep a user on schedule or to take advantage of the destination opportunities discussed below. This list is illustrative only, as still other contextual cues will be obvious to those of ordinary skill in the art having the benefit of this disclosure.

At step 405, the method 400 optionally includes latency detection. Embodiments of the disclosure contemplate that if a person is traveling by car along Interstate 85 and makes the request "where is the nearest gas station," one answer to that question may be a gas station atop an exit ramp that is five hundred feet away. If the person's vehicle is four lanes to the left, there may not be enough time for the person to safely merge across four lanes of traffic to reach the exit ram five hundred feet away. Accordingly, in one or more embodiments, the method 400 can employ a latency to further filter potential navigation information to a navigation information response. In one or more embodiments, the latency can be a function of one or more of transit mode and bearing. Rather than selecting a station at an exit that is five hundred feet away, the method 400 may select an exit that is two miles away as a function of the fact that the person is in a car traveling seventy miles per hour and the two-mile distance provides suitable time for the person to safely merge.

Accordingly, in one embodiment step 405 includes determining a minimum latency as a function of one or more of the transit mode, the direction of transit, the speed of transit, or a geo-location of an electronic device. Distance to an exit ramp is but one example of where the inclusion of such latency determinations is beneficial. Other applications where the optional latency of step 405 would be useful will be obvious to those of ordinary skill in the art having the benefit of this disclosure.

At step 406, the method selects one or more navigation information responses that are a function of at least the transit mode and one or more of the contextual cues. In one embodiment, the navigation information response(s) selected are a function of at least the transit mode and bearing. In other embodiments, the navigation information response(s) are a function of the transit mode, bearing, and other contextual cues such as itinerary information to keep the person on schedule, personal preference information, past behaviors, and so forth. The contextual cues can be used in various combinations as noted above.

At step 407, the method can optimally estimate route opportunities. This feature is best explained by example. If, for example, the method 400 determines that an electronic device is being carried by a person on public transportation such as a subway, it may be the case that the nearest Buster's Coffee shop is somewhere between subway stops. However, as noted above, in one or more embodiments the location detector (202) may access map information from a remote server across a network using the communication circuit (105). The map information can include, but is not limited to, digital road map data, route alternatives, route guidance, route algorithms, route storing algorithms, map databases having distributed map database and traffic databases, and the like. In this example, the map information can include a mapping of subway stops. Each subway stop represents a route opportunity. Accordingly, where step 407 is included, the method 400 may prioritize Buster's Coffee shop locations nearer to subway stops over those farther from subway stops despite the fact that the latter may be closer to the electronic device when the request for navigational information is made. While subway stops are one example of route opportunities, there are others as well. These include highway exits, road intersections, and so forth. Others will be obvious to those of ordinary skill in the art having the benefit of this disclosure.

At step 408, the method 400 filters the potential navigation response information obtained at step 402 to obtain one or more contextually relevant navigation information responses. Depending upon the request for navigation information that was received at step 401, the filtering operation occurring at step 408 can take different forms.

For example, in one or more embodiments the filtering of step 408 includes the application of value functions to navigation information response data obtained at step 402 corresponding to select optimized responses that are most beneficial to a user based upon one or more detected contextual cues. A heuristic filter function configured to consider travel mode, bearing, and other contextual cues to estimate how contextually relevant a particular navigation information response may be can be used. From the estimate, only contextually relevant navigation information responses may be selected for provision to a user. Where latency is determined at step 405, the filtering of step 408 can further be a function of any determined minimum latency.

In one or more embodiments, step 408 comprises filtering a plurality of destinations, obtained at step 402, satisfying the request for navigational information received at step 401. In one or more embodiments this filtering occurring at step 408 is a function of the transit mode, the direction of transit, the speed of transit, and the geo-location to select one or more destinations for the navigation information response.

In one or more embodiments, where the request for navigational information received at step 401 included a destination name where a plurality of destinations each have the destination name, the filtering can be a function of the transit mode, the direction of transit, the speed of transit, and the geo-location to select a destination matching the destination name within a predefined range that the electronic device is approaching. In one or more embodiments, where the contextual cues detected in step 404 comprise personal information cues, the filtering of step 408 can include filtering a plurality of destinations satisfying the request for navigational information received at step 401 as a function of the transit mode, the direction of transit, the speed of transit, the geo-location, and the user preference cues to select a destination for the navigation information response. The filtering of step 408 can further include ranking or otherwise sorting the one or more destination opportunities as a function of the user preference cues detected at step 404.

At step 409, the method 400 presents the one or more contextually relevant navigation information responses to a user. For example, one or more processors (103) can present the one or more contextually relevant navigation information responses on the user interface (102) of an electronic device. Alternatively, in a voice-controlled system, the one or more processors (103) may cause an audio output device, such as a loudspeaker, to annunciate audibly the one or more contextually relevant navigation responses. In one or more embodiments, the navigation information response constitutes only a single, most contextually relevant destination as determined from a value function. In one or more embodiments, the navigation information response comprises one or more destination opportunities determined in step 406. In one or more embodiments, the navigation response can include a navigation route 420 determined at step 404. For example, it may be simpler for a user to find a particular destination when its location is described in reference to the determined navigation route 420.

In one or more embodiments, information from the physical sensors (200) and/or the virtual sensors (300) are input into one or more processors (103) of an electronic device and are processed in accordance with the method of FIG. 4 to receive a request for navigational information, identify a transit mode, a bearing, and optionally one or more other context cues, to provide a navigation information response that is a function of the transit mode, bearing, and, where included, the other context cues. Illustrating by example, if a person asks, "find the nearest Buster's Coffee shop," this is a request for a destination. However, since Buster's Coffee shop is a national chain, there are a plurality of destinations, i.e., many different Buster's Coffee shops that can potentially satisfy the request. However, by filtering this plurality of destinations by transit mode, bearing, and/or other contextual cues, the one or more processors (103) select one or more destinations that are within a predefined range that the electronic device is approaching. Said differently, the filtering can select one or more destinations that are ahead of the user and are along the user's path.

In some embodiments, this may include a selection of a single Buster's Coffee shop that best suits the user in that it keeps the user on schedule and requires—relatively—minimal time to reach. This information can be presented to the user in a variety of ways. Illustrating by example, in one embodiment only a single destination having the highest value score is presented, either aurally via a loudspeaker or visually along the user interface (102). Where this is the case, the user may have the option to say, "navigate," to start the navigation process to the single destination. However, the one or more processors (103) may also alert the user to the fact that there are two, three, four, or more other options, thereby allowing the user to see or hear those as well. In other embodiments, multiple destinations may be presented to the user, thereby allowing them to select which they prefer.

Turning now to FIGS. 5-8, illustrated therein are examples of embodiments of the disclosure operating in context. As the general system components and method steps of embodiments of the disclosure have been described, a discussion of a few explanatory use cases is in order. While these use cases illustrate some of the many advantages offered by embodiments of the disclosure, others will be readily obvious to those of ordinary skill in the art having the benefit of this disclosure.

Figure 5:
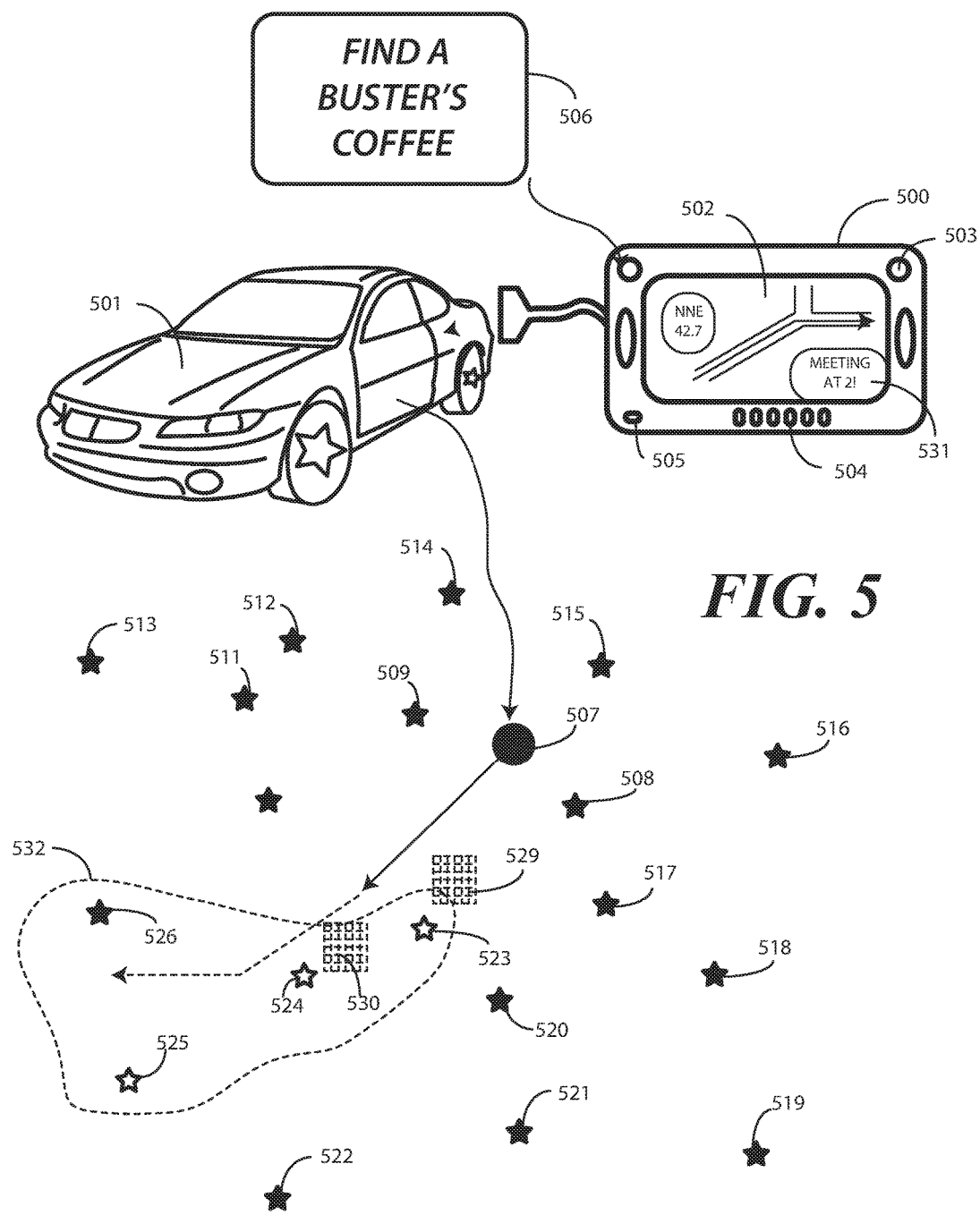
FIGS. 5-8 illustrate various embodiments of the disclosure.

Beginning with FIG. 5 illustrated therein is a diagram of one application for a navigation system 500 in accordance with one or more embodiments of the disclosure. In this illustrative embodiment, the navigation system 500 can be coupled to or integrated a vehicle 501.

In the illustrative embodiment of FIG. 5, the navigation system 500 includes various interface elements such as a display 502, one or more control knobs 503, one or more speakers 504, a microphone 505, and any other interface elements required by a particular application or environment. In one embodiment, the navigation system 500 is in communication with a remote server (not shown), from which it can request and display route guidance data including, navigation route data, traffic data, and digital roadmap data. While these are illustrative details of the navigation system 500, embodiments of the invention are not limited. As those skilled in the art will appreciate, the user interface and corresponding elements of FIG. 5 are merely one embodiment used to illustrate representative components, but that do not reflect all possible user interface devices or elements that may be employed.

In one or more embodiments, the navigation system 500 is either coupled to, or in communication with, the vehicle 501. This allows the navigation system 500 to receive vehicular data corresponding to performance of the vehicle. This vehicular data can include, but is not limited to the type of vehicle, the speed of travel, the direction of travel, the time of day, geo-location 507, and so forth.

In this illustrative embodiment, the navigation system 500 receives a request for navigational information 506. Here, the request for navigational information 506 is an audible request stating, "Find a Buster's Coffee." In this example, since Buster's Coffee is a chain, a plurality of destinations 508,509,510,511,512,513,514,515,516,517,518,519,520, 521,522,523, 524,525,526 potentially satisfy the request for navigational information 506. Accordingly, the problem that embodiments of the disclosure solves is how to filter these to provide a navigation information response 527 that is contextually relevant to a user.

As described above, in one or more embodiments the navigation system 500 first identifies the mode of transit. Since the navigation system 500 is coupled to or in communication with the vehicle 501, this task is simple. The mode of transit is that of a private vehicle.

Next, the navigation system 500 detects a bearing 528. Here, the bearing 528 comprises both a direction of transit and a speed of transit. Additionally, the navigation system 500 detects one or more contextual cues from an environment about the navigation system 500. Illustrating by example, by accessing a remote server, the navigation system 500 is able to identify congested traffic 529,530 in two locations. Additionally, by communicating with a smartphone belonging to the user that stores itinerary information 531 in memory, the navigation system 500 determines that the user has a meeting in thirty minutes that cannot be missed. Next, using a latency sensor (308), the navigation system 500 determines that while there are two destinations 508,509 that the vehicle 501 is approaching in accordance with its bearing 528 from its geo-location 507, there would not be sufficient time for the vehicle 501 to make the necessary lane changes and turns required to reach these destinations 508,509.

With this transit mode, bearing 528, and other contextual cue information, the navigation system filters, with one or more processors, the plurality of destinations 508,509,510, 511,512, 513,514,515,516,517,518,519,520,521,522,523, 524,525,526 potentially satisfy the request for navigational information 506 as a function of the transit mode, bearing 528, geo-location 507, and other contextual cues to select one or more destinations 523,524,525,526 for a navigation information response 527. Here, the navigation information response 527 provides four possible destinations, i.e., four Buster's Coffee locations, matching the destination name of the request for navigational information 506 that are within a predefined range 532 that the navigation system 500 and vehicle 501 are approaching. In this illustrative embodiment, the navigation system 500 has prioritized destination 526 as the single destination most contextually relevant to the user so as to maintain the user's itinerary information 531. While destination 523 and destination 524 are actually closer, the congested traffic 529,530 would result in the user being behind schedule. Accordingly, when considering all contextual cues, the navigation system 500 is able to provide a single destination, i.e., destination 526, which is most contextually relevant to the user. Additionally, non-contextually relevant destinations, i.e., destinations 508,509,510,511,512, 513,514,515,516,517, 518,519,520,521,522, are not presented to the user, thereby simplifying the navigation and the overall user experience.

Figure 6:
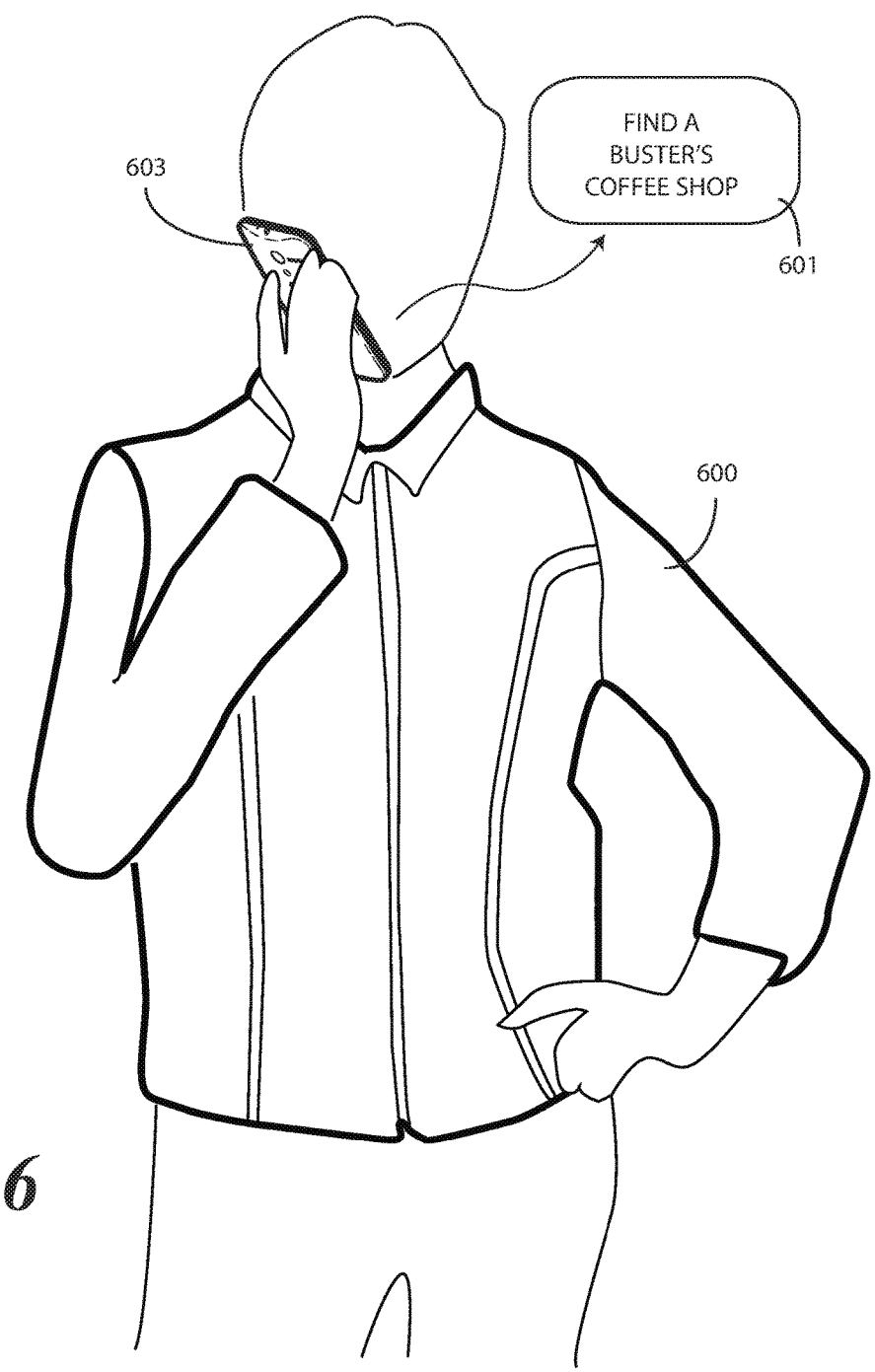
Figure 7:
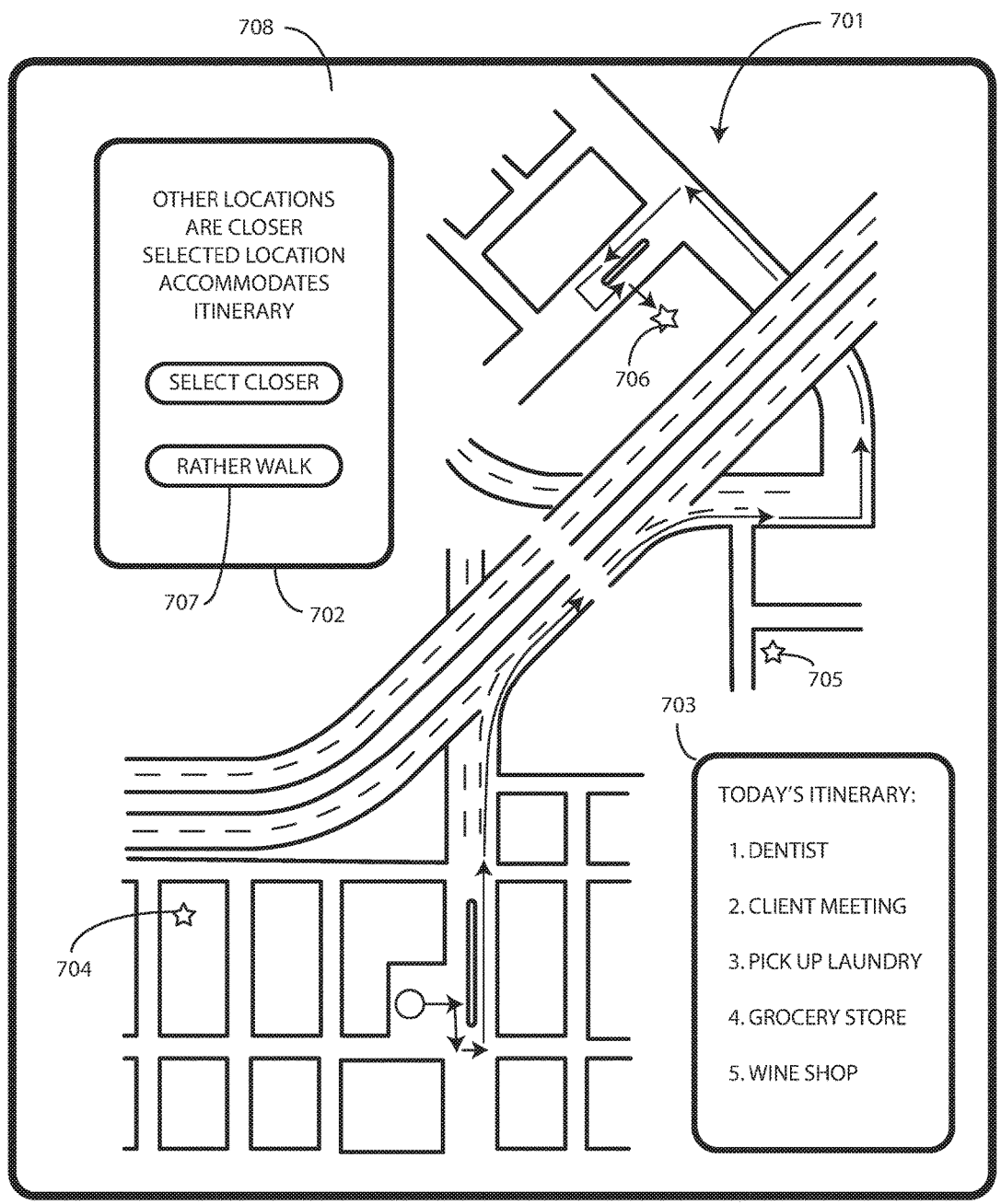
Figure 8:
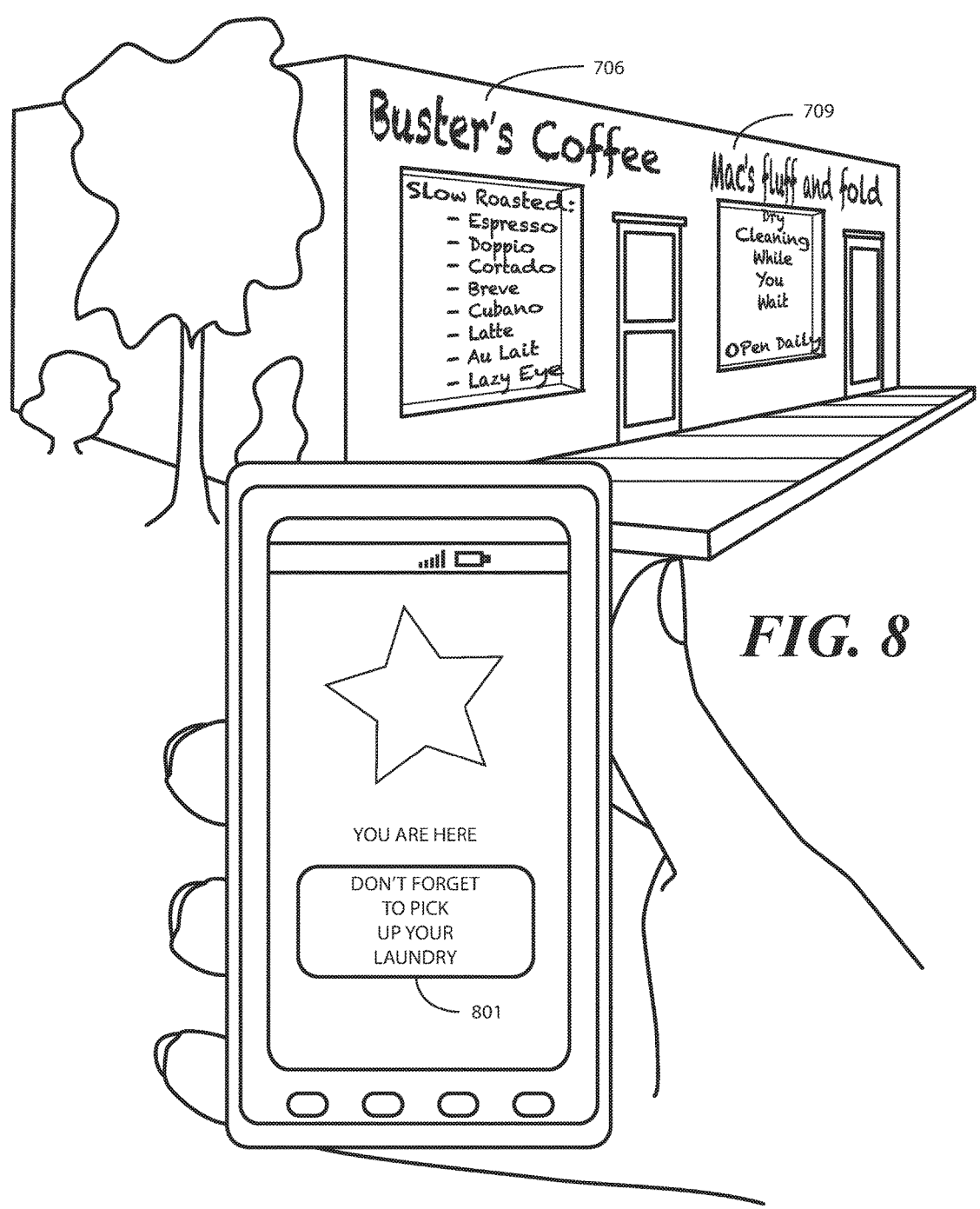

Turning now to FIGS. 6-8, illustrated therein is another use case. Beginning with FIG. 6, a user 600 has an electronic device 603 configured in accordance with one or more embodiments of the disclosure. As with the use case of FIG. 5, an audio capture device of the electronic device 603 receives a request for navigational information 602. As before, the request for navigational information 602 is an audible request stating, "Find a Buster's Coffee."

The electronic device 603 next identifies the mode of transit. Here, the user 600 is walking. In one embodiment, the one or more processors (103) of the electronic device 603 are operable with a motion detector (204) to detect this walking motion. In one or more embodiments, the motion detectors (204) are operable to detect predefined motions corresponding to human motion. These predefined motions can be small, and can include vibration, shaking, breathing, micromotions, and so forth. For instance, if the user is walking, the motion detectors (204) can detect this movement. The one or more processors (103) can then extract parametric data from electronic signals delivered by these motion detectors (204) in response to the user walking. By comparing the parametric data to a reference file stored in memory (104), the one or more processors (103) can identify the walking motion as corresponding to the motion of the user's body. The one or more processors (103) can use this information to distinguish the electronic device 603 being in a user's pocket while walking compared to, for example, being transported on a subway train.

Next, the one or more processors (103) determine the bearing of the user's walk. This can be done as previously described using, for example, motion detectors (204), geo-location detectors, or other sensors. The one or more processors (103) can further detect other contextual cues using the various physical sensors (200) and virtual sensors (300) in various combinations. In this embodiment, the user's itinerary is again considered. The one or more processors (103) then filter potential navigation information responses as a function of the transit mode, bearing, and other contextual cues.

Turning to FIG. 7, the one or more processors (103) next provide a navigation information response 701 that is a function of the transit mode and the one or more contextual cues to a user interface, the display 708 in this case, of the electronic device (603). Note that the display 708 has been selected in this example as a function of the transit mode. To wit, since the user (600) is walking, it can be more convenient for the user to glance at the navigation information response 701 rather than try to listen to aural information over street noise.

Here, in addition to providing the navigation information response 701, the one or more processors (103) also present user options 702 and the user's itinerary 703. As shown on the navigation information response 701, there are three Buster's Coffee destinations 704,705,706. A first Buster's Coffee destination 704 is close and within walking distance. A second Buster's Coffee destination 705 is a short drive away. A third Buster's Coffee destination 706 is farther than the first two.

Working in conjunction with the preference engine (111), the one or more processors (103) determine that the user (600) still has items left to perform on the itinerary 703. Thus, despite detecting walking as the present transit mode, the preference engine (111) prioritizes the user's itinerary 703 over transit mode and bearing in an effort to assist the user in completing her itinerary 703 for the day. However, to ensure that the user (600) has complete control, the user options 702 allow the user to select a closer location, e.g., Buster's Coffee destination 705. Alternatively, the user (600) can select to continue the transit mode by selecting a "rather walk" icon 707.

Trusting the preference engine (111), the user (600) does not change the recommended contextually relevant location, i.e., the third Buster's Coffee destination 706, that is recommended by the one or more processors (103). As shown in FIG. 8, to her delight, when she arrives at the third Buster's Coffee destination 706, she finds she's next to Mac's Fluff and Fold 709, where she can pick up her laundry to accomplish another task on her itinerary. To further enhance the user experience, the one or more processors (103) of the electronic device 603 present a reminder 801 for the user (600) to pick up her laundry after enjoying a delicious Buster's coffee.

As illustrated and described, embodiments of the disclosure consider contextual cues, including preference information, transit mode, and bearing, to provide both better navigation assistance and a better overall user experience. For example, when one or more processors (103) of an electronic device 603 detect that a user (600) is driving, it returns navigation information responses that are consistent with the user's current driving context when considering factors such as driving direction and speed, next available opportunity, e.g., the next exit if driving on a highway. Other uses and advantages will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    receiving, with an audio capture device, a request for navigational information;
    determining a plurality of navigation information responses satisfying the request for navigational information;
    identifying, with one or more processors, a transit mode;
    detecting, with one or more sensors, one or more contextual cues from an environment about the electronic device;
    filtering the plurality of navigational information responses satisfying the informational request as a function of the transit mode and the one or more contextual cues to obtain a subset of navigation information responses; and
    providing, with the one or more processors, at least one navigation information response selected from the subset of navigation information responses to a user interface of the electronic device.

2. The method of claim 1, wherein the one or more contextual cues comprise a direction of transit the electronic device.

3. The method of claim 2, wherein the one or more contextual cues further comprise a speed of transit of the electronic device.

4. The method of claim 3, wherein the one or more contextual cues further comprise a geo-location of the electronic device.

5. The method of claim 4, further comprising also filtering, with the one or more processors, the plurality of destinations satisfying the request for navigational information as another function the direction of transit, the speed of transit, and the geo-location to select one or more destinations for the navigation information response.

6. The method of claim 5, the one or more destinations comprising a single destination.

7. The method of claim 5, further comprising determining, with the one or more processors, a minimum latency as a function of one or more of the transit mode, the direction of transit, the speed of transit, or the geo-location, the filtering further a function of the minimum latency.

8. The method of claim 4, the request for navigational information comprising a destination name, wherein a plurality of destinations each have the destination name, further comprising filtering the plurality of destinations as a function of the transit mode, the direction of transit, the speed of transit, and the geo-location to select a destination matching the destination name within a predefined range that the electronic device is approaching.

9. The method of claim 4, the one or more contextual cues further comprising user preference cues, further comprising filtering, with the one or more processors, a plurality of destinations satisfying the request for navigational information as a function of the transit mode, the direction of transit, the speed of transit, the geo-location, and the user preference cues to select a destination for the navigation information response.

10. The method of claim 9, the user preference cues comprising itinerary information stored within a memory of the electronic device.

11. The method of claim 4, further comprising determining, with the one or more processors, one or more destination opportunities satisfying the request for navigation information, the navigation information response comprising the one or more destination opportunities.

12. The method of claim 11, the one or more contextual cues further comprising user preference cues, further comprising ranking the one or more destination opportunities as a function of the user preference cues.

13. The method of claim 11, further comprising estimating, with the one or more processors, a navigation route of the electronic device, the navigation information response comprising the navigation route.

14. An electronic device, comprising:
    one or more processors;
    a user interface, operable with the one or more processors;
    one or more sensors, operable with the one or more processors;
    a transit mode detection engine, operable with the one or more processors and the one or more sensors; and
    a bearing detection processing engine, operable with the one or more processors and the one or more sensors;
    the one or more processors:
        receiving, from the user interface, a request for navigational information;
        determining a plurality of navigation responses satisfying the request for navigation information;
        identifying, with the transit mode detection engine, a transit mode for the electronic device;
        detecting, with the bearing detection processing engine, a bearing for the electronic device;
        selecting, by filtering the plurality of navigation information responses satisfying the request for navigational information as a function of the transit mode and the bearing; and
        delivering the navigation information response to the user interface.

15. The electronic device of claim 14, the one or more processors further to determine a speed of transit of the electronic device from the one or more sensors and to further select the navigation information response as a function of the speed of transit.

16. The electronic device of claim 15, further comprising a preference engine to identify one or more user preferences, the one or more processors to further select the navigation information response as a function of the one or more user preferences.

17. The electronic device of claim 16, the one or more user preferences comprising a user itinerary.

18. The electronic device of claim 15, the one or more processors further to determine a minimum latency as a function of one or more of the transit mode, the bearing, or the speed of transit, and further to select the navigation information response as a function of the minimum latency.

19. The electronic device of claim 14, the one or more sensors comprising a wireless communication device to identify a number of received wireless communication signals, the transit mode detection engine to identify the transit mode as a function of the number of received wireless communication signals.

20. The electronic device of claim 14, further comprising a geo-location sensor, the one or more processors further to determine a geo-location of the electronic device from the geo-location sensor, and further to select the navigation information response as a function of the geo-location.

* * * * *